Oct. 30, 1962     D. E. RUTTEN     3,061,063
SILO CHUTE HOPPER
Filed March 20, 1961
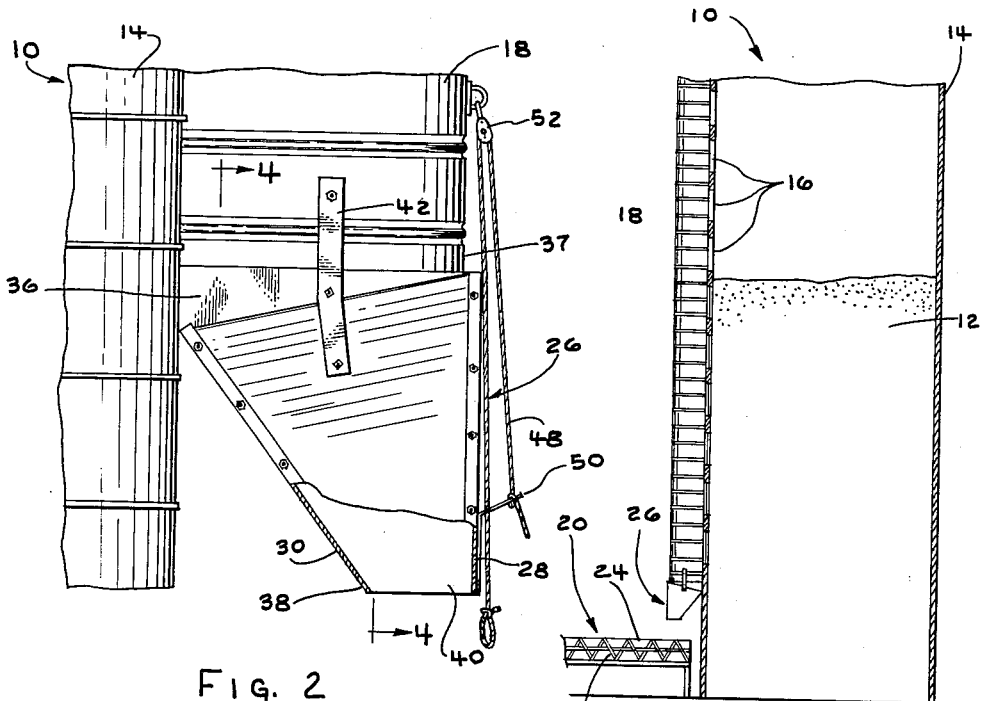
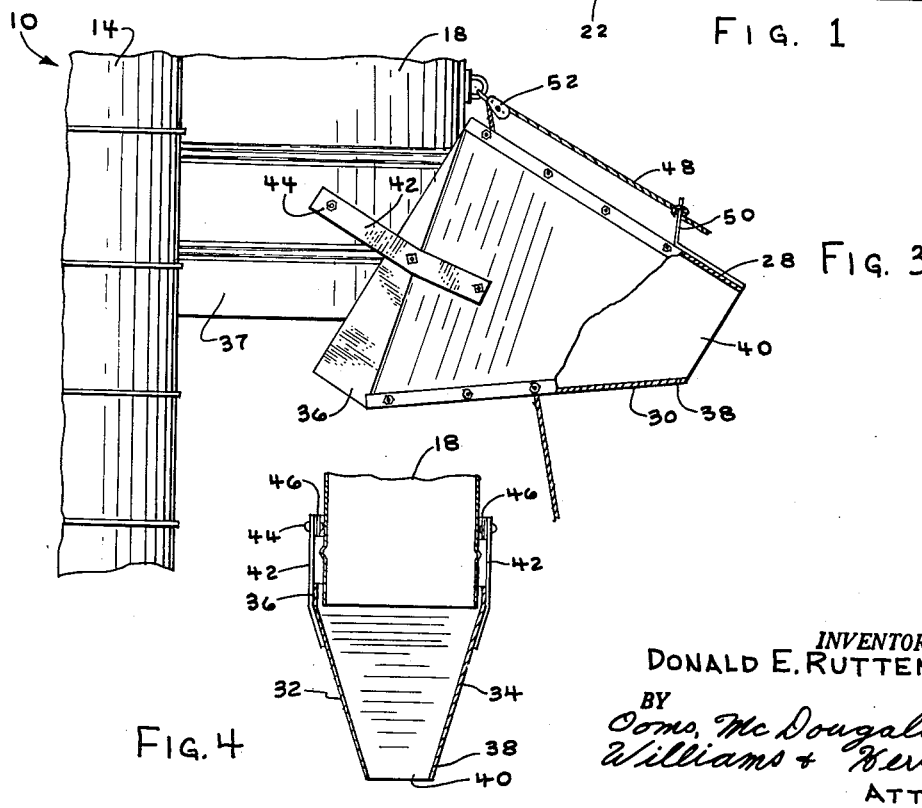
INVENTOR.
DONALD E. RUTTEN
BY
Ooms, McDougall,
Williams & Hersh
ATT'YS.

3,061,063
SILO CHUTE HOPPER
Donald E. Rutten, 109 Division St., Plainfield, Ill.
Filed Mar. 20, 1961, Ser. No. 96,756
3 Claims. (Cl. 193—17)

This invention relates to silos of the type adapted to hold silage intended for animal feed.

One principal object of the present invention is to provide a new and improved hopper for a silo chute of the type commonly arranged to extend vertically along the side of a silo.

Another object is to provide a new and improved hopper of the foregoing character, adapted to direct the silage, when unloaded from the silo, into a mechanical feeder, or into a trough, truck, wagon or other receptacle.

A further object of the present invention is to provide a new and improved silo chute hopper having an open bottom and adapted to funnel the silage into a mechanical feeder or the like, without spillage or loss of the silage.

It is a further object of the present invention to provide a new and improved hopper of the foregoing character, arranged in such a manner that the hopper may be swung away from the bottom of the silo chute, so that a person may enter the chute or the silo, for various purposes, such as cleaning the chute or the silo, removing or adjusting the silo doors, or adjusting and maintaining the mechanical unloader which may be provided within the silo.

A further object is to provide a new and improved silo chute hopper which is convenient and effective in operation, yet is highly economical.

Further objects and advantages of the present invention will appear from the following description, taken with the accompanying drawings, in which:

FIG. 1 is a diagrammatic elevational sectional view taken through a silo equipped with a silo chute hopper to be described as an illustrative embodiment of the present invention.

FIG. 2 is a fragmentary elevational view, showing the silo chute hopper, the view being partly in section to show details of the hopper.

FIG. 3 is a view similar to FIG. 2, but showing the hopper swung away from the lower end of the chute, to permit a person to enter the chute.

FIG. 4 is a sectional view, taken generally along a line 4—4 in FIG. 2.

It will be seen that FIG. 1 illustrates a silo 10 of the type commonly employed on farms for storing silage 12 for use as feed for cattle and other animals. The illustrated silo 10 is in the form of a tall, elongated structure having a cylindrical wall 14. Along one side, the cylindrical wall 14 is formed with a plurality of doors 16 spaced along a vertical line. It will be understood that the doors 16 may be employed for entering and unloading the silo 10. Thus, the silo 10 may be unloaded by removing silage from the top of the mass of silage 12 and throwing the silage outwardly through a convenient door 16, located above the level of the silage 12. Such door 16 may be opened for this purpose. While the silage could be removed manually in this manner, it is more convenient to remove the silage with an unloading machine (not shown), suspended in the silo from a tripod or other support in the top of the silo. The construction and use of such unloading machines are well known to those skilled in the art, so that it will not be necessary to illustrate or describe the unloading machine which is usually provided in the silo 10.

Outside the line of doors 16, the silo 10 is provided with a vertical chute or conduit 18 which guides the silage as it falls downwardly from the doors. The chute 18 may be generally semi-cylindrical in cross-section, or of any other suitable shape. The illustrated chute 18 extends downwardly to a point near the bottom of the silo 10. The chute 18 may be arranged to discharge the silage into a trough or other suitable receptacle, or into a mechanical feeder 20, which may comprise an auger-type conveyor 22 mounted in a trough 24. The mechanical feeder 20 carries the silage to the feed trough where it is distributed to the cattle or other animals.

At its lower end, the silo chute 18 is provided with a hopper 26 which receives the silage from the chute and funnels the silage into the mechanical feeder 20. Thus, the illustrated hopper 26 has front and rear walls 28 and 30 which converge toward each other in a downward direction. In this case, the front wall 28 is substantially vertical, while the rear wall 30 is disposed at an inclined angle. The hopper 26 also has side walls 32 and 34 which converge toward each other in a downward direction. In this case, both of the side walls 32 and 34 are inclined, but at opposite angles.

It will be seen that the hopper 26 has an upper portion 36 which is large enough to enclose the lower end section 37 of the semi-cylindrical chute 18. The hopper 26 tapers downwardly to a relatively small lower portion 38 having an opening 40 therein through which the silage is discharged into the mechanical feeder 20. The funnel action of the hopper 26 assures that all of the silage will be discharged into the feeder, without spillage or loss.

At times, it is necessary to enter the chute 18 to clean out the chute, to adjust or remove the doors 16, to adjust and maintain the mechanical unloader in the silo 10, or for various other purposes. In accordance with the present invention, such entry is facilitated by arranging the hopper 26 so that it may be swung outwardly and upwardly, away from the lower end of the chute 18, as shown to advantage in FIG. 3. Thus, the illustrated hopper 26 is swingably suspended from the chute 18 by means of arms or straps 42 which are riveted, bolted or otherwise secured to the side walls 32 and 34 of the hopper 26. The upper ends of the arms 42 are supported by pivots 44 which are connected to the lower section 37 of the chute 18, either directly, or to brackets 46 mounted thereon. The arms 42 are of sufficient length to permit the hopper 26 to be swung outwardly and upwardly so as to expose the lower end of the chute 18.

To facilitate the operation of the hopper 26, a line 48 may be attached to a bracket 50 on the hopper 26. The line 48 may be strung upwardly, around a pulley 52, and then downwardly to a point accessible to the operator. By pulling on the lower end of the line 48, the hopper 26 may be swung upwardly. The line may then be anchored to hold the hopper 26 in its raised position.

It will be apparent that the hopper of the present invention provides convenient and effective means for funneling the silage into the mechanical feeder. The hopper may be swung away from the lower end of the silo chute so that a person may climb up into the lower end of the chute when cleaning, inspection or maintenance work is necessary within the chute or the silo.

Various modifications, alternative constructions and equivalents may be employed without departing from the true spirit and scope of the invention, as exemplified in the foregoing description and defined in the following claims.

I claim:

1. An attachment for a silo chute, comprising a vertical conduit for carrying silage, a downwardly tapering hopper connected to the lower end of said conduit for funneling the silage from said conduit into a restricted delivery zone, a pair of arms pivotally connected to said conduit and secured to said hopper, said hopper being swingable outwardly and upwardly on said arms to expose the lower end of said conduit, a pulley on said conduit, and a line connected to said hopper and strung upwardly, around said pulley and downwardly for swinging said hopper upwardly.

2. In a silo having a plurality of doors in the side thereof arranged in a vertical path, a generally semi-cylindrical vertically disposed chute formed on the outside of said silo, said chute enclosing the vertical path of doors and terminating at a position spaced above the bottom of the silo, a discharge hopper for the lower end of said chute, said hopper having a funnel-like enclosure tapering downwardly for funneling silage discharged through the chute into a restricted delivery zone, the top of said hopper adapted to fit over the lower end of said chute, means joining said hopper to said chute to permit outward and upward swinging of the hopper away from the lower end of the chute, said means comprising arms having their upper ends pivotally attached to opposite sides of the outside of said chute and extending generally downwardly therefrom, said arms having their lower ends fixedly attached to opposite sides of said hopper, and said arms being of sufficient length and the pivotal attachments being located on the chute to accommodate the outward and upward swinging of the chute whereby the bottom of said chute is exposed to permit entry of personnel.

3. A device as set forth in claim 2 in which there is included a pulley on the front of said chute, an anchor on the front of said hopper near the bottom thereof, and rope means engaging said anchor and threaded through said pulley, whereby a pulling of the rope causes the hopper to be pulled upwardly away from the bottom of the chute.

References Cited in the file of this patent
UNITED STATES PATENTS

| | | |
|---|---|---|
| 846,596 | Moore | Mar. 12, 1907 |
| 1,094,726 | Latimer | Apr. 28, 1914 |